United States Patent Office 3,851,018
Patented Nov. 26, 1974

3,851,018
CROSSLINKED FLUOROELASTOMER AND COMPOSITION CONTAINING SAME
Thomas James Kelly, Metarie, La., assignor to E. I. du Pont de Nemours and Company, Wilmington, Del.
No Drawing. Filed July 31, 1973, Ser. No. 384,375
Int. Cl. C08f *15/40, 29/22*
U.S. Cl. 260—900           3 Claims

ABSTRACT OF THE DISCLOSURE

A crosslinked fluoroelastomer which is useful for the preparation of extrudable fluoroelastomer compositions can be made by copolymerizing (A) about 2–10 mole percent of a perfluorodivinyl ether of the formula $CF_2=CF-O(CF_2)_n-O-CF=CF_2$,
(B) about 50–85 mole percent of vinylidene fluoride,
(C) about 5–48 mole percent of hexafluoropropylene or pentafluoropropylene and
(D) from 0 to about 40 mole percent of tetrafluoroethylene or a perfluoroalkyl perfluorovinyl ether. A fluoroelastomer composition having excellent ability to be extruded or milled can be made by using a blended fluoroelastomer obtained by mixing about 10–50 percent by weight of the resulting copolymer with about 50–90% by weight of a non-crosslinked fluoroelastomer such as one made by copolymerizing vinylidene fluoride and hexafluoropropylene.

BACKGROUND OF THE INVENTION

This invention relates to fluoroelastomers. An important embodiment of the invention concerns fluoroelastomer compositions capable of being processed in an extruder or rubber mill.

Prior art fluoroelastomer compositions in many cases are difficult to process in rubber mills and extruders. For example, some of the commonly-used compositions are too soft and sticky on the mill or calender rolls and extrude poorly. Thus, the industries which manufacture and use fluoroelastomer compositions are in need of a fluoroelastomer composition which can be shaped efficiently and accurately by means of an extruder, and which can easily be processed on a rubber mill.

SUMMARY OF THE INVENTION

The present invention provides a crosslinked fluoroelastomer which is the product of copolymerizing (A) about 2–10 mole percent of a perfluorodivinyl ether of the formula $CF_2=CF-O(CF_2)_n-O-CF=CF_2$ wherein $n$ is a whole number of 2–24,
(B) about 50–85 mole percent of vinylidene fluoride,
(C) about 5–48 mole percent of hexafluoropropylene or pentafluoropropylene and
(D) from 0 to about 40 mole percent of tetrafluoroethylene or a perfluoroalkyl perfluorovinyl ether.

The invention also provides a fluoroelastomer composition which comprises (1) about 10–50 percent by weight of the crosslinked fluoroelastomer defined above and
(2) about 50–90 percent by weight of a non-crosslinked fluoroelastomer.

DESCRIPTION OF PREFERRED EMBODIMENTS

The preparation of the crosslinked fluoroelastomer of the present invention is preferably conducted so that the product of the copolymerization reaction is crosslinked to such an extent that its insolubility value is about 35–75%. The insolubility value indicates the percent by weight of the fluoroelastomer which does not dissolve when a one gram sample of the copolymer and 100 grams of acetone are placed in a 250 ml. beaker and allowed to sit for seven days at 25°C. Useful results are also obtained however when the novel fluoroelastomer has an insolubility value as low as about 30% or as high as about 100%. The insoluble portion of the crosslinked fluoroelastomer will usually undergo considerable swelling in the presence of acetone or other solvents which will normally dissolve prior art uncured vinylidene fluoride copolymer elastomers.

In a particular application, if the crosslinked fluoroelastomer is not crosslinked to such a degree (as measured by the insolubility value) that it gives the desired amount of improvement in processing (e.g. milling or extruding) properties of the blended composition, it is advisable to increase the degree of crosslinking, for example by (a) increasing the proportion of the component A ether, (b) increasing the copolymerization reaction time, and/or (c) increasing the reaction temperature (within reasonable limits).

An especially useful perfluorodivinyl ether to use as component A of the copolymerization reaction mixture is perfluoropentamethylene-bis(perfluorovinyl ether). The component A ethers and their preparation are known in the art. It is known for example that they can be prepared by first reacting perfluorinated diacid fluorides with hexafluoropropylene epoxide; then the resulting adduct is converted to the divinyl ether by pyrolyzing the sodium salt of the acid obtained from the difluoride.

As indicated above in the Summary of the Invention, the presence of monomer component D in the copolymerization reaction mixture is optional. Component D can be present in an amount equal to about 0.5–40 mole percent based on the total amount of monomers used in the reaction mixture. The perfluoroalkyl perfluorovinyl ether preferably has 1–5 carbon atoms in the alkyl group. It is especially preferred to use perfluoromethyl perfluorovinyl ether.

The crosslinked fluoroelastomer obtained from the copolymerization reaction usually contains polymerized units of the monomers used in a molar ratio about equal to the ratio of monomers present in the reaction mixture.

The novel crosslinked fluoroelastomer is preferably prepared as a latex by carrying out the copolymerization reaction in an aqueous medium. This can be done by using substantially the same aqueous polymerization methods known to be useful for preparing the non-crosslinked fluoroelastomer discussed below.

The non-crosslinked fluoroelastomer component of the present extrudable composition can be any vinylidene fluoride copolymer elastomer whose insolubility value is about 0–5 percent. Among the most useful non-crosslinked fluoroelastomers are copolymers of vinylidene fluoride and hexafluoropropylene or pentafluoropropylene; copolymers of vinylidene fluoride, tetrafluoroethylene and hexafluoropropylene or pentafluoropropylene; and copolymers of vinylidene fluoride, hexafluoropropylene, and a perfluoroalkyl perfluorovinyl ether.

In preparing the non-crosslinked fluoroelastomer, one skilled in the art will be able to select the proportion of ingredients and reaction conditions for the copolymerization reaction which will result in a vinylidenefluoride copolymer which is an elastomer. It is shown in ASTM Special Publication No. 184 that an elastomer is a substance that can be stretched at room temperature to at least twice its original length, and after having been stretched and the stress removed, returns with force to approximately its original length in a short time. The following publications teach how to prepare highly soluble fluoroelastomers (having little or no crosslinking): U.S. Pats. 2,968,649; 3,136,745; 3,163,628; 3,235,537; 3,331,823; 3,335,106 and 3,579,474. It will be apparent from such prior art that it is well known how to prepare a latex of a non-crosslinked fluoroelastomer by carrying out the copolymerization reaction in an aqueous medium. It is also well known how to isolate a fluoroelastomer from a latex by coagulation and filtration; useful methods are illustrated in U.S. Pats. 3,536,683 and 3,598,794.

A fluoroelastomer composition of the present invention having desirable extruder and mill processing properties can be prepared by mixing a latex of the crosslinked fluoroelastomer with a latex of a non-crosslinked fluoroelastomer, and isolating the blended fluoroelastomer of the latex mixture. The latex mixture is prepared from a sufficient amount of each latex so that the blended fluoroelastomer has a crosslinked fluoroelastomer content of about 10–50 percent and a non-crosslinked fluoroelastomer content of about 50–90% based on the combined weight of the two different elastomers.

The latex mixture itself can be considered as a useful article of commerce since it can be shipped to the plants of customers who will blend it with various additives or subject it to certain processes which will convert it into final products such as coating compositions, extruded articles or molded or laminated products.

The present composition can also be prepared by mixing the two different fluoroelastomers on a rubber mill or while they are in the form of solid particles (e.g. wet or dry crumb) or in the form of a dispersion in an organic liquid.

Before the fluoroelastomer composition of this invention is formed into shaped structures such as films, laminates, extruded shapes or molded articles, it is usually preferred to mix the blended fluoroelastomer with additives including curing agents, for example a crosslinking agent and a vulcanization accelerator known to be useful for the preparation of cured fluoroelastomer products. In some of the best embodiments of the composition, a hydroxylic aromatic compound is employed as the crosslinking agent. Useful known accelerators include certain quaternary phosphonium compounds, quaternary ammonium compounds and guanidine compounds; see U.S. Pats. 3,655,727; 3,686,143 and 3,712,877 and French Pat. 71–20887.

Hydroxylic aromatic compounds suitable for use in a curing system for fluoroelastomers, and the amount to be used, are well known in the art. Some of the most useful compounds, including various bisphenols and hydroquinones, are described in U.S. Pat. 3,686,143 issued to Bowman (column 2, line 48 to column 3, line 51). One can also use the oxidizable aromatic hydroxy compounds mentioned in U.S. Pats. 3,655,727 and 3,712,877 issued to Patel et al., as well as esters of hydroxylic aromatic compounds.

In making up the present composition, the above-described curing ingredients can be replaced or combined with other known fluoroelastomer curing ingredients or other known additives for fluoroelastomer compositions, such as those mentioned in the patents referred to above.

As indicated above, the novel crosslinked fluoroelastomer of the present invention has utility for the manufacture of extrudable fluoroelastomer compositions. The extrusion operation can be carried out in an extruder of the type commonly used for processing fluoroelastomers wherein the heat and pressure conditions are sufficient to form the material into a fused-together compact mass. The milling performance of non-crosslinked fluoroelastomers can also be improved for certain applications by blending therewith some of the present crosslinked fluoroelastomer. Because of the presence of the crosslinked fluoroelastomer, the composition is more easily and efficiently processed in a rubber mill. A novel fluoroelastomer composition is obtainable according to this invention which is capable of being formed into shaped products efficiently and accurately by means of an extruder.

The following examples illustrate the invention; all amounts are by weight unless otherwise indicated.

Example 1

A crosslinked fluoroelastomer of this invention is prepared by (1) providing a 400 cc. Hastelloy shaker tube of the type suitable for use in carrying out a polymerization reaction at elevated pressures, and which is blanketed by nitrogen; (2) adding to the shaker tube 200 cc. of deoxygenated water, 1.1 gram of ammonium persulfate, 0.15 gram of ammonium perfluorooctanoate, 3 grams of sodium dihydrogen phosphate-heptahydrate, 15 grams (0.034 mole) of perfluoropentamethylene-bis(perfluorovinyl ether), and 10 cc. of a 1 percent aqueous silver nitrate solution; (3) cooling the nitrogen-blanketed tube and its contents to $-75°$ C. in a dry ice-acetone bath; (4) using a vacuum pump to reduce the pressure inside the tube to 1 mm. Hg; (5) adding to the tube 26 grams (0.41 mole) of vinylidene fluoride and 32 grams (0.21 mole) of hexafluoropropylene; (6) warming the tube and its contents to 25° C. and placing it in a conventional tube-shaking apparatus; (7) shaking the tube for four hours while the temperature therein is kept at 60° C., and the interior of the tube is under autogenous pressure; (8) cooling the tube to 25° C. and allowing the pressure therein to return to atmospheric pressure; (9) pouring the resulting fluoroelastomer latex (copolymer solids content of about 42 grams) into a jar; (10) coagulating the latex by freezing it and then warming the contents of the jar to 25° C.; (11) using a filter to isolate the coagulated polymer (fluoroelastomer); (12) washing the polymer three times with water at 25° C. in a blender; and (13) drying the polymer (dry basis weight about 40 grams) by heating it in an oven at 100° C. for 15 hours.

The resulting fluoroelastomer is found to be crosslinked to such an extent that it has an insolubility value of 45 percent; thus, 45 percent by weight of the fluoroelastomer does not dissolve when a 1 gram sample thereof and 100 grams of acetone are placed in a 250 ml. beaker and allowed to sit for seven days at 25° C. This crosslinked fluoroelastomer can be mixed with a non-crosslinked fluoroelastomer to improve the extruding and milling characteristics of the latter.

Example 2

A fluoroelastomer composition of this invention which is capable of being extruded with efficiency and accuracy is prepared by (a) providing a quantity of a latex of a crosslinked fluoroelastomer having a copolymer solids content of 20 parts by following the procedure described above in steps 1–9 of Example 1; (b) providing a quantity of a latex of a non-crosslinked fluoroelastomer having a copolymer solids content of 80 parts, said latex having been prepared by copolymerizing vinylidenefluoride and hexafluoropropylene in the manner described in Nyce's U.S. Pat. 3,723,387, Example 2A, steps 1–4; (c) mixing the latex obtained in step (a) with the latex obtained in step (b); (d) coagulating the blended latex obtained in step (c) by freezing it and then warming the coagulated material to 25° C.; (e) using a centrifuge to isolate the coagulated fluoroelastomer; (f) washing the blended fluoroelastomer in a blender with water at 25° C.; and (g) drying the blended fluoroelastomer by heating it at 120° C.

The fluoroelastomer composition obtained in Example 2 ( sample 2 material) is much more easily processed in a rubber mill and in an extruder than a typical prior art fluoroelastomer material (sample 2A material) composed of a vinylidene fluoride-hexafluoropropylene copolymer isolated from the latex described in step (b) of Example 2. Extrusion comparisons can be carried out if desired on a compounded material such as a composition as described in the last paragraph of this Example, or by blending only the first three ingredients of the said composition. It is recommended to use a two inch Royle extruder fitted with a Garvey die; this type of die is described on page 1311 of "Industrial and Engineering Chemistry," Volume 34, No. 11, November 1942. The sample 2 material extrudes very well in thick cross sections, whereas the sample 2A material extrudes poorly in thick cross sections. The sample 2 material can be extruded faster and with greater smoothness and accuracy. The sample 2 material is considerably less soft and sticky on mill and calender rolls and undergoes less splitting than the sample 2A material; it is therefore easier to process.

Each of the above-described materials is mixed with carbon black and curing agents according to the formula described below to form a curable molding composition, and the composition is molded to form cured test pieces. Test results on the cured sample 2 and 2A test pieces are shown below in Table 1.

TABLE 1

|  | Sample 2 | Sample 2A |
|---|---|---|
| Modulus-100%, p.s.i. | 860 | 760 |
| Elongation at break, percent | 175 | 175 |
| Tensile strength, p.s.i. | 1,950 | 1,780 |
| Compression set | 36 | 38 |

The compression set test (ASTM D-395-61, Method B) is carried out on 1 in. x 0.139 in. O-rings at 204° C. for 70 hours. The other tests of Table I are according to ASTM D-412-66.

Each curable composition is prepared by mixing the following on a two-roll rubber mill whose rolls are at about 25° C.: 100 parts of fluoroelastomer, 30 parts of MT carbon black, 4 parts of magnesium oxide, 2.4 parts of 2-dodecyl-1,1,3,3-tetramethyl guanidine and 0.8 part of hydroquinone. The test pieces are made by molding the composition in a process at 168° C. for ten minutes, followed by post curing the test pieces in an oven at 232° C. for 24 hours.

I claim:
1. A crosslinked fluoroelastomer which is a copolymer containing interpolymerized units in an amount equal to
    (A) about 2–10 mole percent of a perfluorodivinyl ether of the formula $CF_2=CF-O(CF_2)_n-O-CF=CF_2$ wherein $n$ is a whole number of 2–24,
    (B) about 50–85 mole percent of vinylidene fluoride,
    (C) about 5–48 mole percent of hexafluoropropylene or pentafluoropropylene and
    (D) from 0 to about 40 mole percent of tetrafluoroethylene or a perfluoroalkyl perfluorovanyl ether, said fluoroelastomer having an insolubility value of about 30–100%.
2. A fluoroelastomer according to claim 1 wherein component (A) is perfluoropentamethylene-bis(perfluorovinylether).
3. A fluoroelastomer composition which comprises (1) about 10–50 percent by weight of the crosslinked fluoroelastomer defined in claim 1 and (2) about 50–90 percent by weight of a non-crosslinked fluoroelastomer which has an insolubility value of about 0–5%, and which is a copolymer selected from the group: copolymers of vinylidene fluoride and hexafluoropropylene or pentafluoropropylene; copolymers of vinylidene fluoride, tetrafluoropropylene and hexafluoropropylene or pentafluoropropylene; and copolymers of vinylidene fluoride, hexafluoropropylene, and a perfluoroalkyl perfluorovinyl ether.

References Cited
UNITED STATES PATENTS
3,235,537   2/1966   Albin et al. _____ 260—80.5

STANFORD M. LEVIN, Primary Examiner

U.S. Cl. X.R.

260—29.6 RB, 32.8 R, 41 C, 80.76